United States Patent
Sikri et al.

(10) Patent No.: US 9,258,413 B1
(45) Date of Patent: Feb. 9, 2016

(54) SYSTEM AND METHODS FOR REDUCING SILENCE DESCRIPTOR FRAME TRANSMIT RATE TO IMPROVE PERFORMANCE IN A MULTI-SIM WIRELESS COMMUNICATION DEVICE

(71) Applicant: QUALCOMM Incorporated, San Diego, CA (US)

(72) Inventors: Divaydeep Sikri, Woking (GB); Neha Goel, Surrey (GB); Jafar Mohseni, San Diego, CA (US); Mungal Singh Dhanda, Slough (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/499,894

(22) Filed: Sep. 29, 2014

(51) Int. Cl.
H04M 1/00 (2006.01)
H04B 1/38 (2015.01)
H04M 3/42 (2006.01)
H04B 1/3816 (2015.01)
H04W 88/06 (2009.01)

(52) U.S. Cl.
CPC ......... *H04M 3/42246* (2013.01); *H04B 1/3816* (2013.01); *H04W 88/06* (2013.01)

(58) Field of Classification Search
USPC ......... 455/422.1, 550.1, 552.1, 558; 370/328, 370/329
See application file for complete search history.

(56) References Cited

U.S. PATENT DOCUMENTS

| | | | |
|---|---|---|---|
| 6,453,291 B1 * | 9/2002 | Ashley | G10L 25/78 704/200 |
| 8,615,227 B2 | 12/2013 | Su et al. | |
| 8,725,101 B2 | 5/2014 | Ruohonen et al. | |
| 2008/0101286 A1 * | 5/2008 | Wang | H04W 72/1268 370/329 |
| 2014/0120925 A1 | 5/2014 | Kanthala et al. | |
| 2014/0220981 A1 | 8/2014 | Jheng et al. | |
| 2014/0228070 A1 | 8/2014 | Josso et al. | |
| 2014/0315524 A1 * | 10/2014 | Sinha | H04M 3/428 455/414.1 |

* cited by examiner

*Primary Examiner* — Nguyen Vo
(74) *Attorney, Agent, or Firm* — The Marbury Law Group, PLLC

(57) ABSTRACT

Methods and devices are disclosed for enabling improved transmission performance on a multi-SIM wireless communication device. The wireless device may detect a voice communication in a held state on a modem stack associated with the first SIM and an active voice communication on a modem stack associated with the second SIM. The wireless device may detect a conflict between at least one silence descriptor (SID) frame scheduled for transmission by the modem stack associated with the first SIM and a transmit opportunity for the modem stack associated with the second SIM. Once the wireless device identifies a SID frame transmission rate for the modem stack associated with the first SIM, the wireless device may apply a reduction scheme to the SID frames scheduled to be transmitted by the modem stack associated with the first SIM.

28 Claims, 7 Drawing Sheets

SYSTEM AND METHODS FOR REDUCING SILENCE DESCRIPTOR FRAME TRANSMIT RATE TO IMPROVE PERFORMANCE IN A MULTI-SIM WIRELESS COMMUNICATION DEVICE

BACKGROUND

Multi-SIM (subscriber identification module) wireless devices have become increasing popular because of their flexibility in service options and other features.

In various types of multi-SIM wireless communication devices, each modem stack associated with a subscription may store information provisioned by its respective network operator in a SIM, which may allow the SIM to support use of various different communication services. For example, various wireless networks may be configured to handle different types of data, use different communication modes, implement different radio access technologies, etc. One type of multi-SIM wireless device, referred to as a dual-SIM dual-active (DSDA) device, is typically configured with separate transmit/receive chains associated with each SIM, thereby allowing simultaneous active connections with the networks corresponding to two SIMs. Some DSDA devices, referred to as single transmit DSDA devices, are configured with separate receive chains associated with each SIM, and a single shared transmit chain, which reduces hardware costs and power requirements of the device.

When a DSDA device is involved in simultaneous voice calls on both SIMs, one call will be active, and the other call is placed on hold. On the held call, as well as during periods of silence on the active call, voice packets are not transmitted, but control messages and silence descriptor (SID) frames are transmitted at regular intervals over the air interface. Therefore, transmission conflicts may arise when time slots for transmission align between the SIMs. For example, on a single transmit DSDA device, a scheduling conflict may arise when use of the transmit chain is required by both SIMs during aligned time slots. Further, in a DSDA device configured with separate transmit circuitry for each SIM, collisions may arise when the SIMs simultaneously transmit on their respective communication links due to coexistence issues (e.g., radio frequency (RF) interference). As a result, one or multiple transmissions maybe dropped or delayed, increasing power consumption and/or degrade performance.

SUMMARY

Systems, methods, and devices of various embodiments enable a multi-SIM wireless communication device on which at least a first SIM and second SIM are respectively associated with a first RF resource and a second RF resource to improve performance by selectively prioritizing silence descriptor (SID) frames for a SIM to ensure a minimum periodicity of SID transmissions is achieved to maintain a connection while reducing priority of the rest of the SID frames for that SIM when there are simultaneous calls on a DSDA device. Various embodiments may include detecting a held voice communication on a modem stack associated with the first SIM and an method of improving performance of first and second RF resources active voice communication on a modem stack associated with the second SIM, detecting a conflict between at least one silence descriptor (SID) frame scheduled for transmission by the modem stack associated with the first SIM and a transmit opportunity for the modem stack associated with the second SIM, identifying a SID frame transmission rate for the modem stack associated with the first SIM, and applying a reduction scheme to the SID frames scheduled to be transmitted by the modem stack associated with the first SIM. In some embodiments systems, methods and devices, the reduction scheme may be based on the identified SID frame transmission rate. In some embodiment systems, methods and devices, the at least one SID frame contains comfort noise parameters.

In some embodiment systems, methods and devices, identifying a SID frame transmission rate may include identifying a voice codec associated with transmit functions on the wireless communication device, and identifying an interval at which a SID_UPDATE frame is scheduled for transmission on the modem stack associated with the first SIM. In some embodiment systems, methods and devices, applying the reduction scheme may include assigning priorities to the SID_UPDATE frames scheduled for transmission on the modem stack associated with the first SIM, In some embodiment systems, methods and devices, the identified voice codec is an adaptive multi-rate codec, and applying the reduction scheme may include assigning a high priority to one out of every twenty SID_UPDATE frames that do not contain in-band signaling, and assigning a low priority to remaining SID_UPDATE frames that do not contain in-band signaling. In some embodiment systems, methods and devices, the identified voice codec is a full rate, enhanced full rate, or half rate codec, and applying the reduction scheme may include assigning a high priority to one out of every ten SID_UPDATE frames, and assigning a low priority to remaining SID_UPDATE frames.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
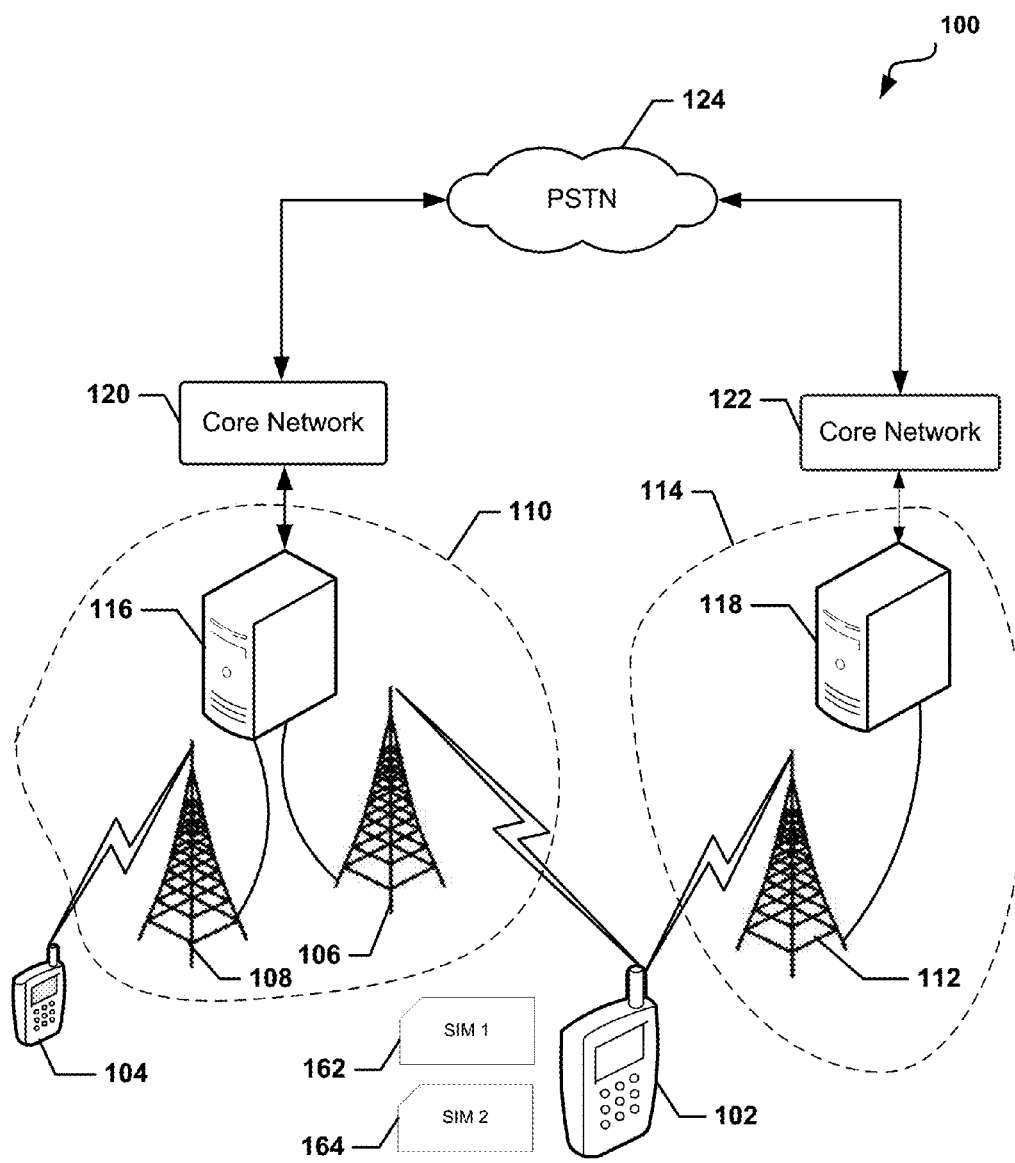
FIG. 1 is a communication system block diagram of a network suitable for use with various embodiments.

Various embodiments will be described in detail with reference to the accompanying drawings. Wherever possible the same reference numbers will be used throughout the drawings to refer to the same or like parts. References made to particular examples and implementations are for illustrative purposes, and are not intended to limit the scope of the invention or the claims.

The various embodiments improve performance of a multi-SIM multi-active (MSMA) wireless communication device engaged in simultaneous voice calls by reducing the rate at which silence descriptor (SID) frames are transmitted during a discontinuous transmission (DTX) period associated with at least one SIM while ensuring that a minimum number of SID updates are transmitted to maintain an on-going connection to a network. In various embodiments, when a conflict is identified between a SID_UPDATE frame on a held call associated with one SIM and a transmit opportunity on an active call associated with another SIM, unnecessary uplink transmissions may be reduced by adjusting the priority of selected SID frames that contain comfort noise parameters (e.g., SID_UPDATE frames) to ensure that SID frames are transmitted often enough to maintain a network connection while reducing the priority of other SID frames, thereby minimizing the transmission rate of SID frames that contain comfort noise parameters. In various embodiments, an arbitrator module may assign a high priority to selected SID_UPDATE frames in order to ensure transmission of the minimum number of such SID frames needed in order to maintain an adequate network connection while reducing the priority of the remainder of the SID_UPDATE frames for that SIM.

The terms "wireless device" and "wireless communication device" are used interchangeably herein to refer to any one or all of cellular telephones, smart phones, personal or mobile multi-media players, personal data assistants (PDAs), laptop computers, tablet computers, smart books, palm-top computers, wireless electronic mail receivers, multimedia Internet enabled cellular telephones, wireless gaming controllers, and similar personal electronic devices that include a programmable processor and memory and circuitry for establishing wireless communication pathways and transmitting/receiving data via wireless communication pathways.

As used herein, the terms "SIM," "SIM card," and "subscriber identification module" are used interchangeably to mean a memory that may be an integrated circuit or embedded into a removable card, which stores an International Mobile Subscriber Identity (IMSI), related key, and/or other information used to identify and/or authenticate a wireless device on a network. The term SIM may also be used as shorthand reference to a communication network associated with a particular SIM, since the information stored in a SIM enables the wireless device to establish a communication link with a particular network, thus the SIM and the communication network, as well as the services and subscriptions supported by that network, correlate to one another.

As used herein, the terms "multi-SIM wireless communication device," "multi-SIM wireless device," "dual-SIM wireless communication device," "dual-SIM dual-active device," and "DSDA device" are used interchangeably to describe a wireless device that is configured with more than one SIM and is capable of independently handling communications with networks of all subscriptions.

As used herein, the terms "wireless network," "cellular network," "system," "public land mobile network," and "PLMN" are used interchangeably to describe a wireless network of a carrier associated with a wireless device and/or subscription on a wireless device, and/or its roaming partners.

As used herein, the terms "discontinuous transmission," "DTX mode," and "DTX period" are used interchangeably herein to refer to a mechanism which allows transmit circuitry to be switched off or reduced during periods when there is no speech data to be sent in order to save power in the device and reduce the overall interference level over the air interface.

Wireless communication networks are widely deployed to provide various communication services such as voice, packet data, broadcast, messaging, and so on. These wireless networks may be capable of supporting communication for multiple users by sharing the available network resources. Examples of such wireless networks include Global System for Mobile Communications (GSM), Code Division Multiple Access (CDMA) networks, Time Division Multiple Access (TDMA) networks, and Frequency Division Multiple Access (FDMA) networks. These wireless networks may also utilize various radio technologies such as Wideband-CDMA (W-CDMA), cdma2000, Global System for Mobile Communications (GSM), etc.

In current mobile communications, wireless service carriers have standardized a number of techniques for selecting wireless communications systems and obtaining service therefrom, in accordance with preferences of the subscriber's service provider/carrier. Service providers generally enable subscribers to access a network by providing provisioning information to subscriber devices. For clarity, the embodiments are described below for GSM-type and/or UMTS-type networks, but may be applied to networks using any other radio technology or protocol.

An example GSM network may operate on any of a number of GSM bands (e.g., GSM 900, GSM 850, etc.), each of which cover multiple radio frequency (RF) channels identified by absolute radio-frequency channel numbers (ARFCNs). The ARFCNs for various GSM bands are given in 3GPP TS 05.05, entitled "Digital cellular telecommunications system (Phase 2+); Radio transmission and reception (Release 1999)." Further, each GSM network typically operates on a specific set of RF channels in a specific GSM band. In describing various embodiments, the terms "channel," "frequency," and "ARFCN" may be used interchangeably and may refer to channels in GSM bands, and/or channels in other network bands (i.e., UARFCNs for UMTS networks, etc.).

A multi-SIM wireless device that supports two or more SIM cards may have a number of capabilities that provide convenience to a user, such as allowing different wireless carriers, plans, telephone numbers, billing accounts, etc. on one device. Developments in multi-SIM wireless communication device technology have led to a variety of different options for such devices. For example, an "active dual-SIM" wireless device allows two SIMs to remain active and accessible to the device. In particular, a type of active dual-SIM wireless communication device may be a "dual-SIM dual active" (DSDA) wireless device in which two SIMs are configured to use separate transmit and/or receive circuitries (i.e., RF resources). Thus, in some DSDA devices, the SIMs may simultaneously operate in any of a variety of modes, such as active/connected mode (i.e., transmitting and/or receiving data), idle mode, etc. In some DSDA devices, the separate RF resources that are assigned to each SIM may be limited to the receive chain, with the SIMs configured to share a single transmit chain. Other multi-SIM wireless communication devices may be configured to operate more than two SIMs in simultaneous active connections, such as by providing a separate transceiver for each of at least three SIMs.

The SIMs in a multi-SIM wireless communication device may be associated with the same or different PLMNs, each of which may have more than one wireless network. Each SIM is generally provisioned by a service provider with a list of preferred PLMNs from which the wireless communication device can receive service (i.e., a home PLMN and roaming partner PLMNs). In some embodiments, the wireless device processor may access non-volatile memory associated with a given one of the SIMs to identify supported radio access technologies, and the corresponding enabled frequency bands (and ARFCNs/UARFCNs/channels in each band).

Although multi-SIM wireless communication devices offer a variety of options to the end user, they also necessitate efficient execution of complex tasks. Further, as wireless communication networks become more pervasive and the number of subscribers continues to increase, wireless bandwidth becomes increasingly scarce. To mitigate this problem, advanced voice compression techniques are used to reduce the bandwidth needed by each voice call. For example, a standard 8-bits per data, 8000 samples per second voice coding, such as 64 kbits/s, may be reduced to 8 kbits/s or less via coder/decoders ("codecs") such as the GSM adaptive multi-rate (AMR) and enhanced full rate (EFR) codecs, and the CDMA enhanced variable rate codec (EVRC). Codecs typically operate on a collection of samples, which are compressed and sent as a frame of data. Some codecs, for example, divide a voice call into 20 ms time periods, sending a frame of voice data once every 20 ms.

Some voice codecs define not only a speech compression algorithm but also a silence compression algorithm. In a typical two-way conversation on a wireless communication device, each individual may speak slightly less than half of the time. During the periods without speech input (i.e., "silence periods") transmitting the background noise detected by the wireless communication device's microphone may be an unnecessary use of network resources, since the silence has no information content.

By reducing the transmit signal during these silence periods, the duty cycle of the wireless communication device and use of network resources may minimized. This reduction in transmit signals may be accomplished on a conventional wireless communication device by employing a discontinuous transmission (DTX) mode. In DTX mode, during silence periods (also referred to as DTX periods), overall efficiency of a wireless voice communication system may be improved, for example, through conserving battery power and easing workload of the transmitter components on the wireless communication device, and freeing the channel to reduce interference and/or share the channel with other signals.

In DTX mode, if the transmit circuitry of the wireless communication device is completely shut off, the background noise that is typically transmitted with the speech also disappears. As a result, a call participant hearing an unnatural sounding audio silence may be misled into thinking that the call has been dropped or disconnected. Therefore, techniques have been developed whereby parameters that characterize the background noise, referred to as comfort noise, are generated and sent in silence descriptor (SID) frames over the air interface at a lower rate than that of speech frames. For example, some codecs may detect the background noise present on the wireless communication device (i.e., near-end device) and characterize the background noise, such as determining its pitch and volume, and transmit the characterization parameters to the wireless communication device of the other party to the call (i.e., far-end receiving device). At the far-end receiving device, the noise parameters may be used to generate a slight background noise, such as soft white noise, recreate the background noise at the near-end sending device and thus convey to the listener the continued presence of the other party on the line.

Based on the received parameters in the SID frame, the codec on the far-end receiving device may synthesize comfort noise, which may simulate the background noise that would typically be heard during transmission of speech frames. For example, the comfort noise parameters may describe comfort noise that is designed to reflect the current spectral and temporal content of the actual background noise at the transmit side. The comfort noise parameters typically include a subset of speech coding parameters, such as synthesis filter coefficients and gain parameters. Example parameters within the SID frame include line spectral frequency (LSF) and energy gain. With these two pieces of information, roughly equivalent to the pitch and volume of the background noise, respectively, the receiving device may recreate (i.e., approximate) the background sound.

Typically, the start and end of a DTX period is indicated by transmitting a SID_FIRST frame and SID_ONSET frame, respectively, to the serving network. During the DTX period, comfort noise parameters are transmitted over the air interface at a fixed rate in SID_UPDATE frames. For example, using the full rate (FR) or enhanced FR (EFR) codec for speech channels in GSM systems, SID_UPDATE frames are typically transmitted at a rate of once per 24 frames (i.e., every 480 ms). Using the half rate (HR) speech codec, SID_UPDATE frames are typically transmitted at a rate that is twice that of the FR codec, or once per 12 frames (i.e., every 240 ms). Further, while adaptive multi-rate (AMR) frames are sent independently of the cell's TDMA frame structure, using the AMR speech codec, SID_UPDATE frames may be transmitted at a rate that is four times higher than that of FR or EFR codecs (i.e., once every 120 ms). In addition to SID frames, transmissions during the DTX period may include control information.

In a DSDA device, when both SIMs are participating in a voice call, one call proceeds as active, while the other is put in a held state for the user. Operations by the modem stack associated with the SIM of the held call may proceed in the same manner as DTX periods on the active voice call. That is, once a call is placed in the hold state (i.e., the call is on hold), the SIM may indicate the start of DTX period to the connected network by transmitting a SID_FIRST frame. Until the end of the call hold (i.e., end of the DTX period) is indicated by transmitting a SID_ONSET frame, SID_UPDATE frames will be repeatedly transmitted to the connected network in order to communicate comfort noise parameters for the device on the receiving end (i.e., other party to the held call). As such, the other party may hear audio indications that the held call has not been dropped. At the same time, the SIM associated with the active voice call enables transmission of voice packets during periods of speech, and transmission of SID frames and control information during periods of silence/DTX periods.

As described, when both SIMs of a DSDA device are participating in a voice call, one call typically proceeds as active while the other call is put in a hold state. In various embodiments, the hold call state may correspond to a discontinuous transmission (DTX) period. That is, for the SIM associated with the call in the hold state, no voice packets may be transmitted. Instead, only SID frames and control information may be transmitted. Similarly, for the SIM associated with the active call, while transmission of voice packets occurs during periods of speech, during the DTX periods (i.e., during pauses between words spoken by each participant) only SID frames and control information may be transmitted.

After the beginning of a DTX period, the SID frames transmitted on the held call (and in the silent periods of the active call) are SID_UPDATE frames, which generally contain parameters that enable the receiver at the other end of the call to generate comfort noise. Unlike voice packets which are transmitted frequently (e.g., once per 20 ms), SID_UPDATE frames may be transmitted infrequently. The fixed interval at which SID_UPDATE frames are transmitted depends on the voice codec used. However, since the information in SID_UPDATE frames is limited to the comfort noise parameters, such SID_UPDATE frames are often repetitive, providing unchanged or redundant comfort noise parameters. In addition, when a SID_UPDATE is dropped or missed (i.e., not received), communication protocols call for the missed SID_UPDATE to be replaced by the last SID frame that was received. In case of a SID_UPDATE frame, assuming the comfort noise parameters have not changed, no necessary information has been lost by the transmission failure, and the receiver of the other participant's device is still able to generate comfort noise based on previous information. In other words, if a SID_UPDATE is not received, the receiver device continues to generate comfort noise using the parameters from the last SID_UPDATE that it received.

FIG. 1 illustrates a wireless network system 100 suitable for use with various embodiments. A first wireless device 102 and a second wireless device 104 may each be configured to establish wireless connections with cell towers or base stations of one or more radio access networks. For example, the wireless devices 102, 104 may transmit/receive data using a first base station 106 and a second base station 108, each of which may be part of a first network 110, as is known in the art. The first wireless device 102 may further be configured to transmit/receive data through a third base station 112, which may be part of a second network 114.

The networks 110, 114 may be cellular data networks, and may use channel access methods including, but not limited to, Frequency Division Multiple Access (FDMA), Time Division Multiple Access (TDMA), Code Division Multiple Access (CDMA), Universal Mobile Telecommunications Systems (UMTS) (particularly, Long Term Evolution (LTE)), Global System for Mobile Communications (GSM), Wi-Fi, PCS, or other protocols that may be used in a wireless communications network or a data communications network. The networks 110, 114 may use the same or different wireless interfaces and/or physical layers. In some embodiments, the base stations 106, 108, 112 may be controlled by one or more base station controllers (BSC) (e.g., a first BSC 116 and a second BSC 118). For example, the base stations 106, 108, the first BSC 116, and other components may form the first network 110, as is known in the art. Alternate network configurations may also be used and the embodiments are not limited to the configuration illustrated. For example, in another embodiment the functionality of the first BSC 116 and at least one of the base stations 106, 108 may be collapsed into a single "hybrid" module having the functionality of these components.

In various embodiments, the first wireless device 102 may simultaneously access multiple core networks (e.g., a first core network 120 and a second core network 122) after camping on cells managed by the base stations 106, 112. The first wireless device 102 may also establish connections with Wi-Fi access points (not shown), which may connect to the Internet. While various embodiments are particularly useful with wireless networks, the embodiments are not limited to wireless networks and may be implemented over wired networks with no changes to the methods.

In the wireless network system 100, the first wireless device 102 may be a multi-SIM wireless communication device that is capable of operating on a plurality of SIMs (e.g., a first SIM 162 and a second SIM 164). For example, the first wireless device 102 may be a dual-SIM wireless communication device. Using dual-SIM functionality, the first wireless device 102 may simultaneously access each of the core networks 120, 122 by camping on cells managed by the base stations 106, 112. The core networks 120, 122 may be interconnected by a public switched telephone network (PSTN) 124, across which the core networks 120, 122 may route various incoming and outgoing communications to the first wireless device 102.

The first wireless device 102 may make a voice or data call to a third party device, such as the second wireless device 104, using one of the SIMs 162, 164. The first wireless device 102 may also receive a voice call or other data transmission from a third party. The third party device (e.g., the second wireless device 104) may be any of a variety of devices, including, but not limited to, a mobile phone, laptop computer, PDA, server, etc.

Some or all of the wireless devices 102, 104 may be configured with multi-mode capabilities and may include multiple transceivers for communicating with different wireless networks over different wireless links/RATs. For example, the first wireless device 102 may be configured to communicate over multiple wireless data networks on different subscriptions, such as in a dual-SIM wireless device. In particular, the first wireless device 102 may be configured with dual-SIM dual-active (DSDA) capabilities, which may enable the first wireless device 102 to simultaneously participate in two independent communications sessions, generally though independent transmit/receive chains.

For clarity, while the techniques and embodiments described herein relate to a wireless device configured with at least one GSM subscription, they may be extended to subscriptions on other radio access networks (e.g., UMTS/WCDMA, LTE, CDMA, etc.).

Figure 2:
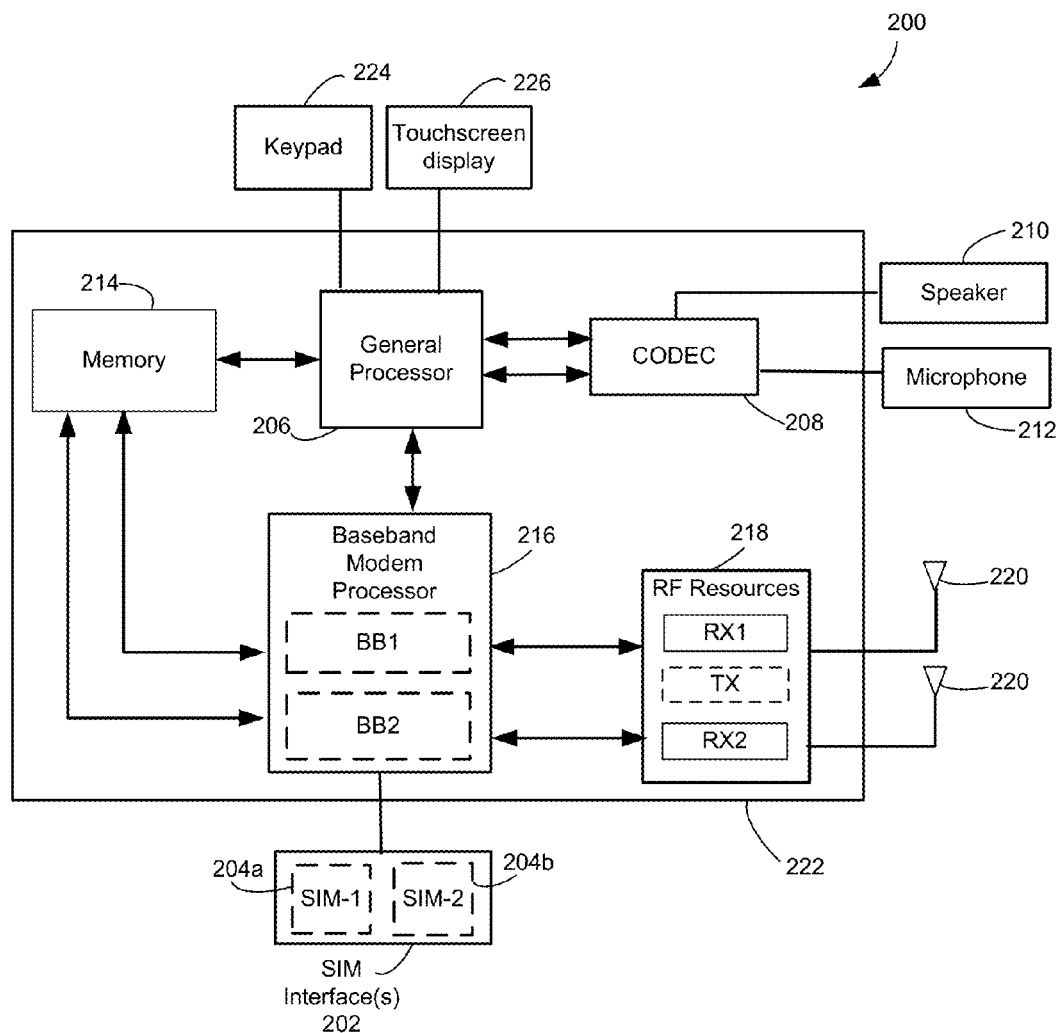
FIG. 2 is a block diagram illustrating a dual-SIM dual-active wireless communication device according to various embodiments.

FIG. 2 is a functional block diagram of a wireless device 200 suitable for implementing various embodiments. According to various embodiments, the wireless device 200 may be similar to one or more of the wireless devices 102, 104 as described above with reference to FIG. 1. With reference to FIGS. 1-2, the wireless device 200 may include a first SIM interface 202a, which may receive a first SIM 204a that is associated with a first subscription. The wireless device 200 may also include a second SIM interface 202b, which may receive a second SIM 204b that is associated with a second subscription.

A SIM in various embodiments may be a Universal Integrated Circuit Card (UICC) that is configured with SIM and/or USIM applications, enabling access to, for example, GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card.

Each of the SIM 204a, 204b may have a CPU, ROM, RAM, EEPROM and I/O circuits. One or more of the SIMs 204a, 204b used in various embodiments may contain user account information, an IMSI a set of SIM application toolkit (SAT) commands and storage space for phone book contacts. One or more of the SIMs 204a, 204b may further store home identifiers (e.g., a System Identification Number/Network Identification Number pair, a Home PLMN (HPLMN) code, etc.) to indicate the SIM network operator provider. An Integrated Circuit Card Identity (ICCID) SIM serial number may be printed on one or more of the SIMs 204a, 204b for identification. However, a SIM may be implemented within a portion of memory of the wireless device 200 (e.g., memory 214), and thus need not be a separate or removable circuit, chip or card.

The wireless device 200 may include at least one controller, such as a general-purpose processor 206, which may be coupled to one or more coder/decoder (CODEC) 208. The CODEC 208 may in turn be coupled to a speaker 210 and a microphone 212. The general-purpose processor 206 may also be coupled to the memory 214.

The memory 214 may be a non-transitory tangible computer readable storage medium that stores processor-executable instructions. For example, the instructions may include routing communication data relating to the first or second subscription though a corresponding baseband-RF resource chain. The memory 214 may store operating system (OS), as well as user application software and executable instructions. The memory 214 may also store application data, such as an array data structure.

The general-purpose processor 206 and memory 214 may each be coupled to at least one baseband modem processor 216. Each of the SIMs 204a, 204b in the wireless device 200 may be associated with a baseband-RF resource chain that may include the baseband modem processor 216—which may perform baseband/modem functions for communicating with/controlling a RAT—and one or more amplifiers and radios, referred to generally herein as RF resources 218. In some embodiments, baseband-RF resource chains may share the baseband modem processor 216 (i.e., a single device that performs baseband/modem functions for all SIMs on the wireless device 200). In other embodiments, each baseband-RF resource chain may include physically or logically separate baseband processors (e.g., BB1, BB2).

The RF resources 218 may be coupled to at least two wireless antennas 220a, 220b, and may perform transmit and/or receive functions for the wireless services associated with each of the SIM 204a, 204b of the wireless device 200. In some embodiments, the RF resources 218 may be coupled to the wireless antennas 220, 221 for sending and receiving RF signals for the SIMs 204a, 204b, thereby enabling the wireless device 200 to perform simultaneous communications with separate networks and/or services associated with the SIMs 204a, 204b. The RF resources 218 may provide separate transmit and receive functionality, or may include a transceiver that combines transmitter and receiver functions. In some embodiments, one or both of the wireless antennas 220a, 220b may each represent a plurality of antennas associated with each RF resource 218, such as to support diversity reception.

In some embodiments, the general-purpose processor 206, the memory 214, the baseband modem processor(s) 216, and the RF resources 218 may be included in the wireless device 200 as a system-on-chip 222. In some embodiments, the first and second SIMs 204a, 204b and their corresponding interfaces 202a, 202b may be external to the system-on-chip 222. Further, various input and output devices may be coupled to components of the system-on-chip 222, such as interfaces or controllers. Example user input components suitable for use in the wireless device 200 may include, but are not limited to, a keypad 224 and a touchscreen display 226, and the microphone 212.

In some embodiments, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive a selection of a contact from a contact list or receive a telephone number. As another example, the request to initiate the outgoing call may be in the form of a voice command received via the microphone 212. Interfaces may be provided between the various software modules and functions in the wireless device 200 to enable communication between them, as is known in the art.

Functioning together, the two SIMs 204a, 204b, the baseband modem processor 216, the RF resources 218, and the wireless antennas 220a, 220b may constitute two or more RATs. For example, a SIM, baseband processor, and RF resource may be configured to support two different radio access technologies, such as GSM and WCDMA. More RATs may be supported on the wireless device 200 by adding more SIM cards, SIM interfaces, RF resources, and/or antennae for connecting to additional mobile networks.

Various embodiment wireless devices may have more than one antenna and/or other transmit chain components for performing transmit functions in an RF resource. The RF resources associated with a SIM may include one or more transmit chains, which may include, without limitation, an RF front end, components of the RF front end (including a transmitter unit), antennas, etc. The RF resources associated with a SIM may also include one or more receive chain that may include, without limitation, an RF front end, components of the RF front end (including a receiver unit), antennas, etc. In various embodiments, portions of the transmit and/or receive chains may be integrated into a single chip, or distributed over multiple chips. Also, a transmit chain, or portions of the transmit chain may be integrated into a chip along with other functions of the wireless device. The various embodiments may be used in wireless systems having two or more antennas and/or receive chains that make up the receive portion of at least one of the RF resources, and having one or more transmit chain.

Figure 3:
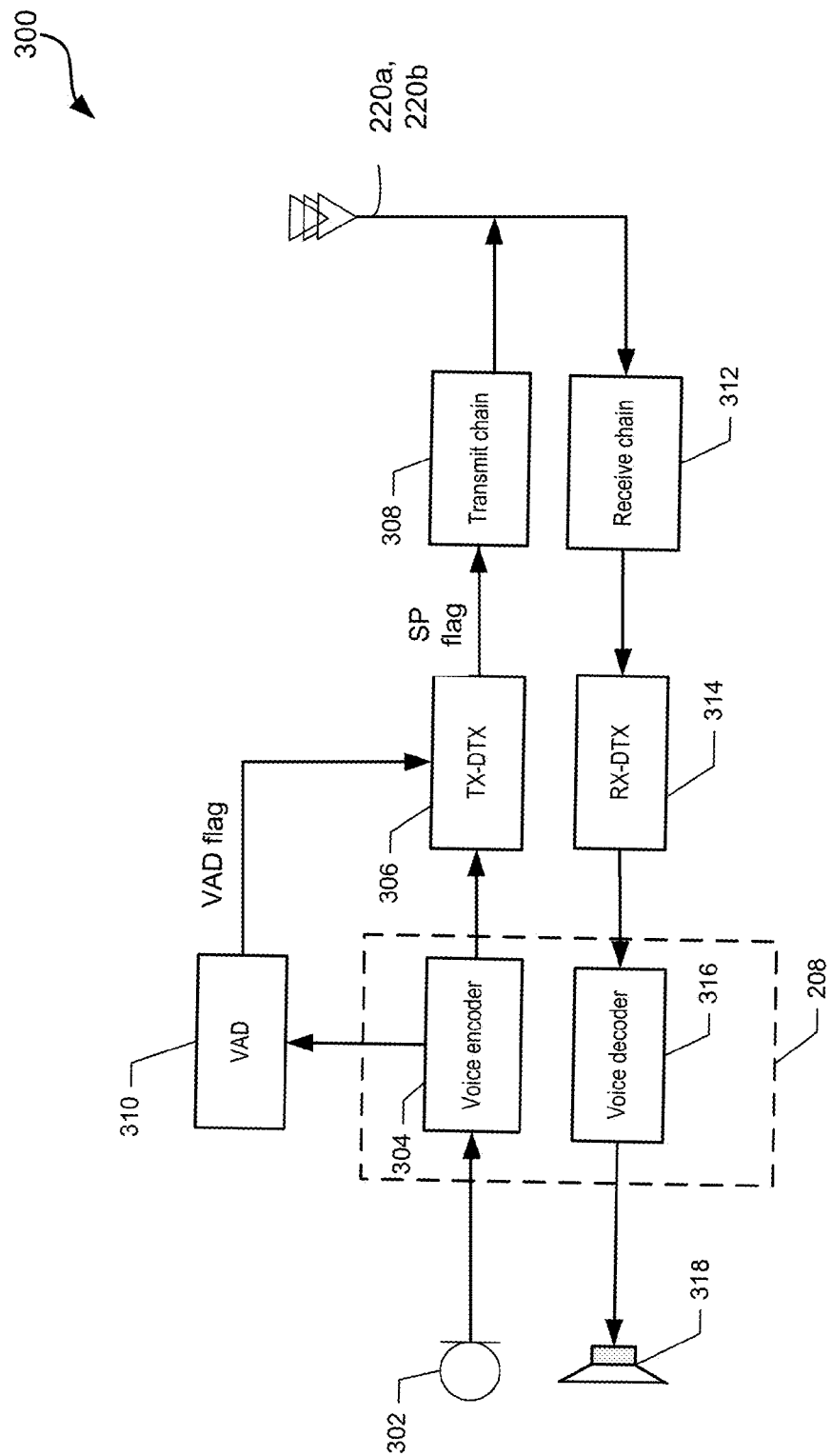
FIG. 3 is a block diagram illustrating an example configuration of components associated with discontinuous transmission (DTX) on one or more radio frequency (RF) resource according to various embodiments.

FIG. 3 illustrates a configuration 300 of DTX elements that may interact in a wireless device to provide capability according to various embodiments. Referring to FIGS. 1-3, such DTX elements in the configuration 300 may be functions and/or components of one of the wireless devices 102, 104, and/or 200 and may be associated with calls enabled on SIM-1 204a and/or SIM-2 204b. In configuration 300 on a wireless communication device (e.g., 102, 200), a microphone 302 (e.g., 212) may convert an acoustic sound into an electric signal, which may in turn be provided to a voice (i.e., speech) encoder 304. In various embodiments, the voice encoder 304 may be part of the one or more CODEC 208. The voice encoder 304 may encode speech to a lower rate, producing speech frames that may be transferred to a TX-DTX processor 306 and forwarded to a transmit chain 308.

In various embodiments, the transmit chain 308 may include any one or more components performing functions to route communication data associated with a particular SIM for transmission through a corresponding baseband-RF resource chain. In some embodiments, the transmit chain 308 may include functional components of the baseband-modem processor(s) 216 (e.g., BB1 or BB2) and RF frontend components of the RF resource(s) 218 to condition signals for transmission. Such RF frontend components may include, for example, the transceiver unit (TX), as well as (not shown) a digital-to-analog converter (DAC), a filter, and an amplifier, the functions and details of which are known in the art of digital transceiver design. In various embodiments, the transmit chain 308 may be associated with one or more of the antennas 220a, 220b. One of the antennas 220a, 220b may be selected for use in transmission based on the configuration of the RF resource(s) 218, the network supported by the SIM, etc. In some embodiments, the transmit chain 308 may be shared between multiple SIMs. In other embodiments, the transmit chain 308 may be one of a plurality of transmit chains of the wireless communication device and may be associated with transmissions enabled by the particular SIM.

When a particular SIM is in an active voice call and the associated modem stack is operating in normal mode, the TX-DTX processor 306 may forward the encoded speech frames to the transmit chain 308, regardless of whether the signal produced by the microphone 302 contains actual speech or mere background noise. Using one of the antennas 220a, 220b, the transmit chain 308 may send the speech frames as an uplink signal over the radio interface to a network (e.g., 110, 114) through a base station (e.g., 106, 108, 112).

In various embodiments, a command received from the network (e.g., base stations 106, 108, 112) may trigger operation in DTX mode. When a particular SIM is engaged in a voice call and the associated modem stack is in DTX mode, a Voice Activity Detector (VAD) 310 may analyze the signal produced by the microphone 302 to determine whether the signal contains speech or only background noise.

Specifically, as defined in accordance with various communication standards (e.g., GSM), the VAD 310 may analyze the energy and spectral changes of the signal produced by the microphone 302. Based upon this analysis, the VAD 310 may generate a VAD flag, whose state indicates whether the signal includes speech (VAD=1) or mere background noise (VAD=0). When the VAD flag is set (VAD=1), the TX-DTX processor 306 may relay normal speech frames. When the VAD flag is not set (VAD=0), the TX-DTX processor 306 may generate SID frames containing comfort noise parameters (e.g., SID_UPDATE frames), which may be passed to the transmit chain 308. The transmit chain 308 may continue to forward these frames to one of the antennas 220a, 220b for updating the comfort noise on the receiving side. In various embodiments, a speech (SP) flag may be set in the control bits of the frames delivered by the TX-DTX processor 306 to the transmit chain 308 to indicate whether the transmitted frame is a normal speech frame (SP=1, SP flag set) or a SID frame (SP=0, SP flag not set).

When the state of the VAD flag changes from being set to not being set, the TX-DTX processor 306 switches from transmitting encoded speech frames delivered by the voice encoder 304 to generating SID frames containing comfort noise parameters. As described, the first SID frame of a silence period may be a SID_FIRST frame. In various embodiments, the first instance of background noise by the VAD 310 may trigger the start of a DTX period (i.e., silence period) regardless of whether the voice call is active or in a hold state.

If the VAD 310 later detects speech from the parameters of the voice encoder 304, the VAD 310 may set the VAD flag in order to direct the TX-DTX processor 306 to restart continuous transmission of speech frames. In various embodiments, restarting transmission of speech frames (i.e., ending the DTX period) may be indicated by the TX-DTX processor 306 generating a SID_ONSET frame.

The TX-DTX processor 306 may generate SID_UPDATE frames by employing or otherwise communicating with a comfort noise generator (not shown) in the wireless communication device. For example, the TX-DTX processor 306 may select as the noise parameters those parameters from the normal speech that provide information on the level and spectrum of the background noise. Mean values corresponding to the duration of a number of speech frames may also be further included within such parameters. In various embodiments, each speech frame may contain a corresponding number of parameters from which a value in common corresponding to the duration of those speech frames may be calculated. These noise parameters may then be transmitted to the network in SID frames.

On the receiving side of the wireless communication device (e.g., 102, 104, 200), shown as part of the configuration 300, a receive chain 312 may receive, via one of the antennas 220a, 220b, an RF downlink signal from a network (e.g., 110, 114) through a base station (e.g., 106, 108, 112) through one of antennas 220a, 220b. In various embodiments, the receive chain 312 may include any one or more components performing functions to route received signals to process communications associated with a particular SIM through a corresponding baseband-RF resource chain. In some embodiments, the receive chain 312 may include functional components of the baseband-modem processor(s) 216 (e.g., BB1 or BB2), and RF frontend components of the RF resource(s) 218. Such RF frontend components may include, for example, receive unit (RX1 or RX2), as well as (not shown) an analog to digital converter (ADC) and a digital down converter (DDC), the functions and details of which are known in the art of digital transceiver design. In various embodiments, the receive chain 312 may be associated with one or more of the antennas 220a, 220b. One of the antennas 220a, 220b may be selected based on the configuration of the RF resource(s) 218, the network supported by a particular SIM, etc. In various embodiments, the receive chain 312 may be one of a plurality of receive chains of the wireless communication device and may be associated with receiving communications enabled by the particular SIM.

The receive chain 312 may separate the downlink frame from the received downlink signal and may apply the downlink frame to a RX-DTX processor 314. The RX-DTX processor 314 may determine whether the downlink frame includes a normal speech frame or a SID frame based on the SP flag of the frame. When the SP flag is set (SP=1), the RX-DTX processor 314 may forward the speech frames to the voice (i.e., speech) decoder 316, which may be part of the one or more CODEC 208. When the SP flag is not set (SP=0), the RX-DTX processor 314 may generate speech frames by synthesizing comfort noise based on the updated parameters in the received SID frame. The speech frame or generated speech frame may be forwarded to the voice decoder 316, which may pass a decoded signal to a speaker 318 (e.g., 210) for conversion into an acoustic signal.

Separate units of a baseband-modem processor (e.g., 216) of a multi-SIM device (e.g., 200) may be implemented as separate structures or as separate logical units within the same structure, and may be configured to execute software including at least two protocol stacks/modem stacks associated with at least two SIMs, respectively. The SIMs and associated modem stacks may be configured to support a variety of communication services that fulfill different user requirements. Further, a particular SIM may be provisioned with information to execute different signaling procedures for accessing a domain of the core network associated with these services and for handling data thereof.

Separate units of the baseband-modem processor of the multi-SIM wireless device may be implemented as separate structures or as separate logical units within the same structure, and may be configured to execute software including at least two protocol/modem stacks associated with at least two SIMs, respectively. The SIMs and associated modem stacks may be configured to support a variety of communication services that fulfill different user requirements. Further, a particular SIM may be provisioned with information to execute different signaling procedures for accessing a domain of the core network associated with these services and for handling data thereof.

While described with respect to GSM and/or UMTS networks, these are merely examples of networks to which serving cells for associated with the modem stacks of various embodiments may belong.

In various embodiments in which a wireless device (e.g., 200) is configured with multiple SIMs each associated with an independent RF resource (e.g., a DSDA device) and/or independent receive circuitry (e.g., a single transmit DSDA device), power consumption and performance improvements may be implemented by reducing the rate of uplink transmission during a DTX period, such as for a voice call in a hold state, in order to avoid transmission conflicts between two or more SIMs.

In various embodiments, these improvements may be accomplished by determining, based on the configurations of the particular voice codec used by the transmit circuitry, a desired transmission rate for SID_UPDATE frames during the held voice call. In various embodiments, such desired transmission rate may be the minimum rate achievable without degrading the connection to the held call network. Based on the desired transmission rate for SID_UPDATE frames, a prioritization process may be employed to specify a percentage of the SID_UPDATE frames scheduled for transmission to be actually transmitted, and to blank (i.e., reduce transmit power to zero) the remaining SID_UPDATE frames that are scheduled. In some embodiments, the prioritization process may assign a low priority to SID_UPDATE frames that are not necessarily required to be transmitted so that transmission blanking (Tx blanking) processes of the wireless device can preferentially select those frames for blanking while transmitting frames from the other SIM or SIMs.

Figure 4:
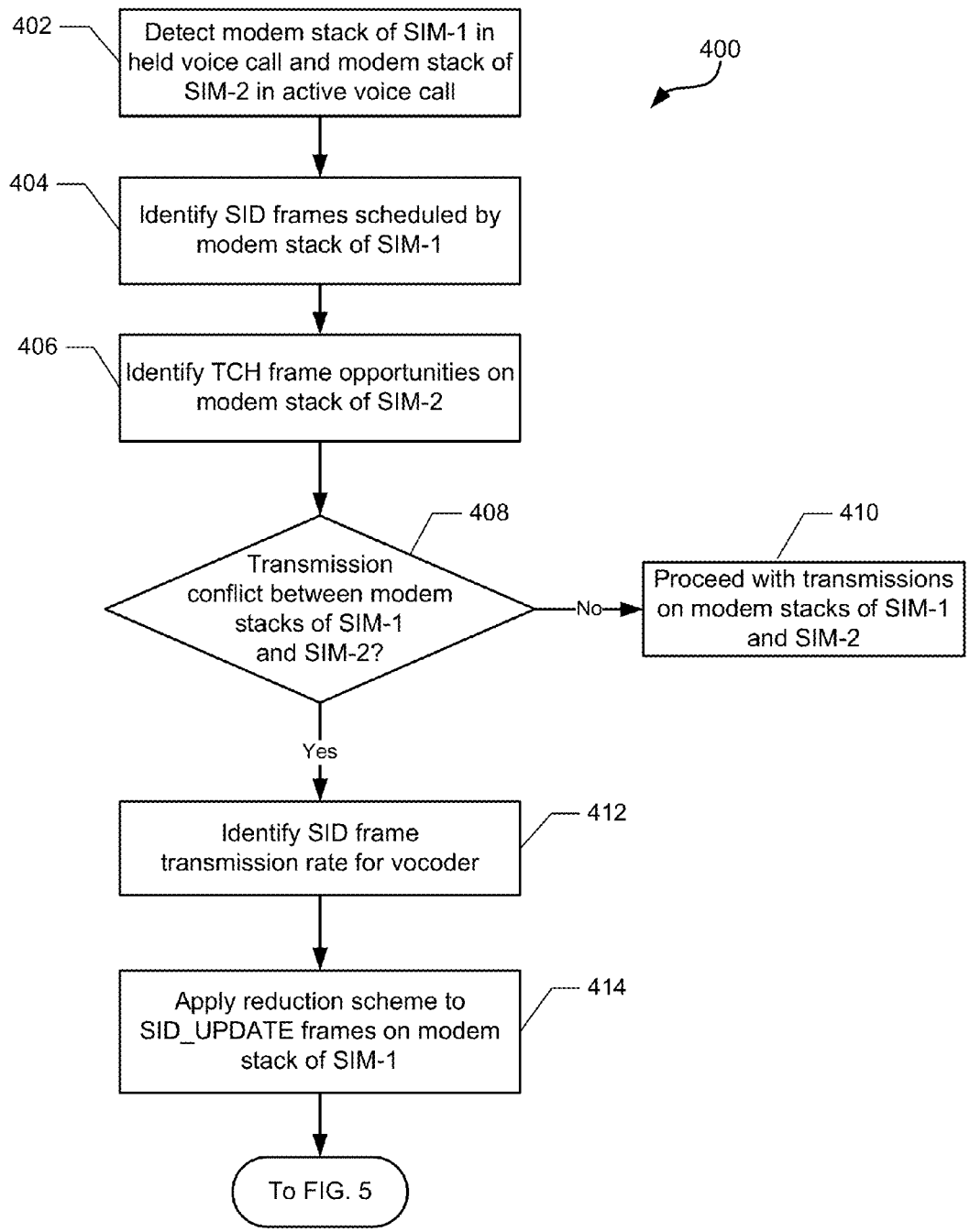
FIG. 4 is a process flow diagram illustrating a method for applying a silence descriptor (SID) frame reduction scheme on at least one SIM of a dual-SIM wireless communication device involved in simultaneous voice calls.

FIG. 4 illustrates a method 400 for improving efficiency and performance with respect to transmission on a multi-SIM multi-active (e.g., DSDA) wireless device (e.g., 102, 104, 200 in FIGS. 1-2) according to some embodiments. In some embodiments, the multi-SIM multi-active device may be configured with RF resources that include separate receiver circuitries for each SIM, but a single transmitter that is shared between the multiple SIMs (e.g., a single transmit DSDA device). In various embodiments, the operations of the method 400 may be implemented by one or more processors of the wireless device, such as the general purpose processor 206 in FIG. 2 and/or baseband modem processor(s) 216, or a separate controller (not shown) that may be coupled to memory (e.g., 214) and to the baseband modem processor(s) 216.

With reference to FIGS. 1-4, the wireless device processor may detect simultaneous voice calls on wireless device in block 402. In particular, the wireless device processor may detect that a modem stack associated with a first SIM ("SIM-1") is participating in a voice call that is in a hold state, and a modem stack associated with a second SIM ("SIM-2") is participating in a voice call that is in an active state. The references to the first SIM (SIM-1) and the second SIM (SIM-2) are arbitrary and used merely for the purposes of describing the embodiments, and the wireless device processor may assign any indicator, name, or other designation to differentiate the SIMs and associated modem stacks. Further, embodiment methods apply the same regardless of which SIM is involved in an active voice call.

The wireless device (e.g., 102, 104 in FIG. 1, 200) may have a layered software architecture to communicate with the first and second networks. The software architecture may be distributed among one or more baseband modem processor(s) 216, which may be part of and/or connected to the RF communication resources 218. In various embodiments, such a layered software architecture may include multiple protocol stacks, each of which may be associated with a different SIM. The protocol stacks may be implemented to allow modem operation using information provisioned on multiple SIMs. Therefore, a protocol stack that may be executed by a baseband modem processor is interchangeably referred to herein as a modem stack. While mediating transmission conflicts may depend on the particular radio access technologies of the network(s) carrying the calls, the RF resources of the wireless device, and the particular parameters of one or more voice codecs configured on the device, general SID frame scheduling may proceed according to method 400.

In block 404, the wireless device processor may identify upcoming SID frames scheduled for transmission by the modem stack associated with the first SIM. In block 406, the wireless device processor may identify upcoming transmission opportunities (e.g., transmit channel (TCH) frames) on the modem stack associated with the second SIM.

In determination block 408, the wireless device processor may determine whether a SID frame transmission conflict exists or will exist between the modem stacks associated with the first and second SIMs. For example, in a DSDA device in which each SIM is associated with independent RF resources to perform both receive and transmit functions, the SID frame transmission conflict may be an interference collision. In a single transmit DSDA device, the transmission conflict may be an overlap in scheduling use of a shared transmit resource for transmitting a SID frame for on SIM and frames for the other SIM.

In response to determining that no transmission conflict exists or will exist between the modem stacks associated with the first and second SIMs (i.e., determination block 408="No"), the modem stacks associated with the first and second SIMs may both proceed with the transmissions for their respective held and active voice calls in block 410.

In response to determining that a transmission conflict exists or will exist between the modem stacks associated with the first and second SIMs (i.e., determination block 408="Yes"), the wireless communication device processor may identify the rate of SID frame transmissions employed by a voice encoder of the wireless device in block 412. The SID frame transmission rate may be identified, for example, by an arbitrator module operating in the physical layer of the modem stack associated with the first SIM. In some embodiments, the arbitrator module may receive SID_UPDATE frames from the voice encoder (i.e., vocoder), which may be used to identify the SID frame transmission rate. In some embodiments, the SID_UPDATE frame transmission rate may be determined by determining (e.g., recalling from memory) the vocoder in use by the wireless device.

Using the identified SID_UPDATE frame transmission rate, the wireless device processor may apply a reduction scheme to the SID_UPDATE frames scheduled by the modem stack associated with the first SIM in block 414. In various embodiments, the reduction scheme may be implemented in the arbitrator module operating in the physical layer of the modem stack associated with the first SIM. For example, the arbitrator module may assign a high priority to selected SID_UPDATE frames so that the minimum number of SID_UPDATE frames needed in order to maintain an adequate network connection on the first SIM are transmitted. In various embodiments, if the wireless device is configured to use an adaptive multi-rate (AMR) vocoder, the arbitrator module may assign a high priority to one out of every twenty of the SID_UPDATE frames that does not contain in-band signaling and assign a low priority to the remaining SID_UPDATE frames not containing in-band signaling. For example, the arbitrator module may assign a high priority to one out of every twenty of the SID_UPDATE frames that does not contain in-band signaling and assign a low priority to the remaining nineteen SID_UPDATE frames not containing in-band signaling. If the wireless device is configured to use a full rate (FR), enhanced full rate (EFR), or half rate (HR) vocoder, the arbitrator module may assign a high priority to at least one out of every ten SID_UPDATE frames and assign a low priority to the remaining SID_UPDATE frames. For example, the arbitrator module may assign a high priority to one out of every ten of the SID_UPDATE frames and assign a low priority to the remaining nine SID_UPDATE frames. The wireless device processor may use the priorities assigned to SID_UPDATE frames in block 414 to decide whether frames are transmitted or blanked in the method 500 illustrated in FIG. 5.

Figure 5:
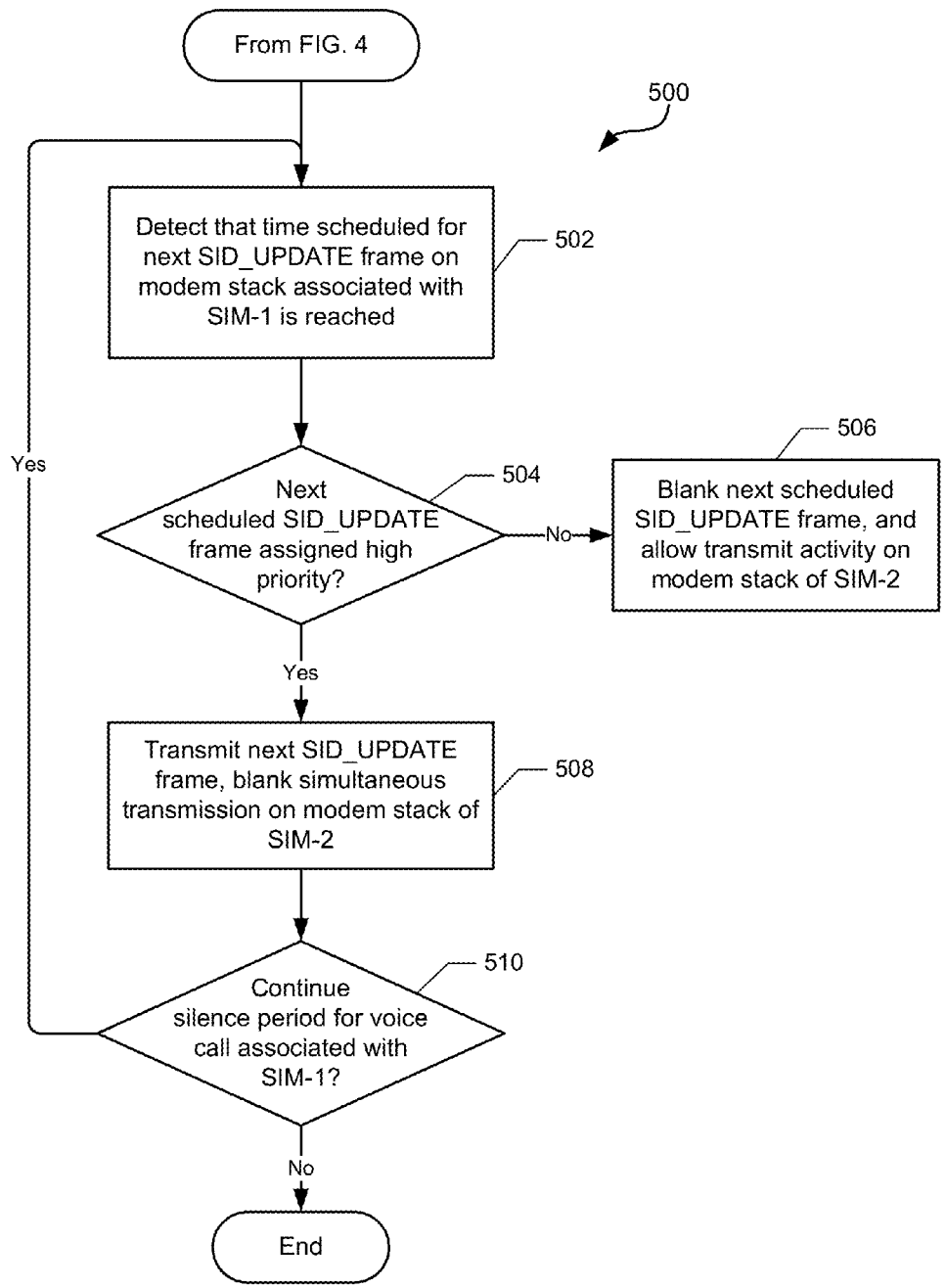
FIG. 5 is a process flow diagram illustrating a method of using the SID frame reduction scheme in FIG. 4 to reduce transmission conflicts for simultaneous voice calls on an example dual-SIM wireless communication device.

FIG. 5 illustrates a transmission method 500 that may be implemented for each conflict found in determination block 408 in method 400 (FIG. 4) according to some embodiments. The operations of the method 500 may be implemented by one or more processors of the wireless device, such as the general purpose processor 206 in FIG. 2 and/or baseband modem processor(s) 216, or a separate controller (not shown) that may be coupled to memory (e.g., 214) and to the baseband modem processor(s) 216.

With reference to FIGS. 1-5, in block 502, the wireless device processor may detect that the time scheduled for a next SID_UPDATE frame on the modem stack associated with the first SIM has been reached. In determination block 504, the wireless device processor may determine whether the next scheduled SID_UPDATE frame is assigned a high priority (i.e., as a result of the operations of the method 400). In response to determining that the next scheduled SID_UPDATE is not assigned a high priority (i.e., determination block 504="No"), in block 506 the wireless device processor may "blank" (i.e., reduce transmit power to zero) the low priority next scheduled SID_UPDATE, while allowing performance of the transmit activity on the modem stack associated with the second SIM.

In response to determining that the next scheduled SID_UPDATE has been assigned a high priority (i.e., determination block 504="Yes"), in block 508 the wireless device processor may transmit the high priority SID_UPDATE frame and blank the simultaneous transmission activity on the modem stack associated with the second SIM.

In determination block 510, the wireless device processor may determine whether to continue the silence period of the voice call associated with the first SIM (i.e., whether to maintain the hold state). For example, the active call associated with the second SIM may have been terminated, thereby allowing the held call associated with the first SIM to become active and allowing the user to speak. As described, this determination may be made by checking a flag in memory (e.g., determining whether a VAD 310 is set to 1) or determining whether a SID_ONSET frame is scheduled for transmission by the modem stack associated with the first SIM. In another example, the held voice call may be terminated by the other party to the call before becoming active, thereby ending the communication with the network associated with the first SIM. In response to determining that the silence period of the voice call associated with the first SIM is continuing (i.e., determination block 510="Yes"), the wireless device processor may again detect when the time scheduled for a next SID_UPDATE frame on the modem processor associated with the first SIM is reached in block 502 to repeat the method 500 so long as the call is in the silence period.

In response to determining that the silence period of the voice call associated with the first SIM should not be continued (i.e., determination block 510="No"), the method 500 of blanking low priority SID frames may end and the processor of the wireless device may return to performing operations of the method 400.

As discussed, the references to first SIM/SIM-1 and second SIM/SIM-2, as well as first and second modem stacks, are arbitrary, and may apply to either or any SIM or associated functions implemented by a processor and/or RF resource(s). Further, such designations of SIMs and/or modem stacks may be switched or reversed between instances of executing the methods herein.

Figure 6:
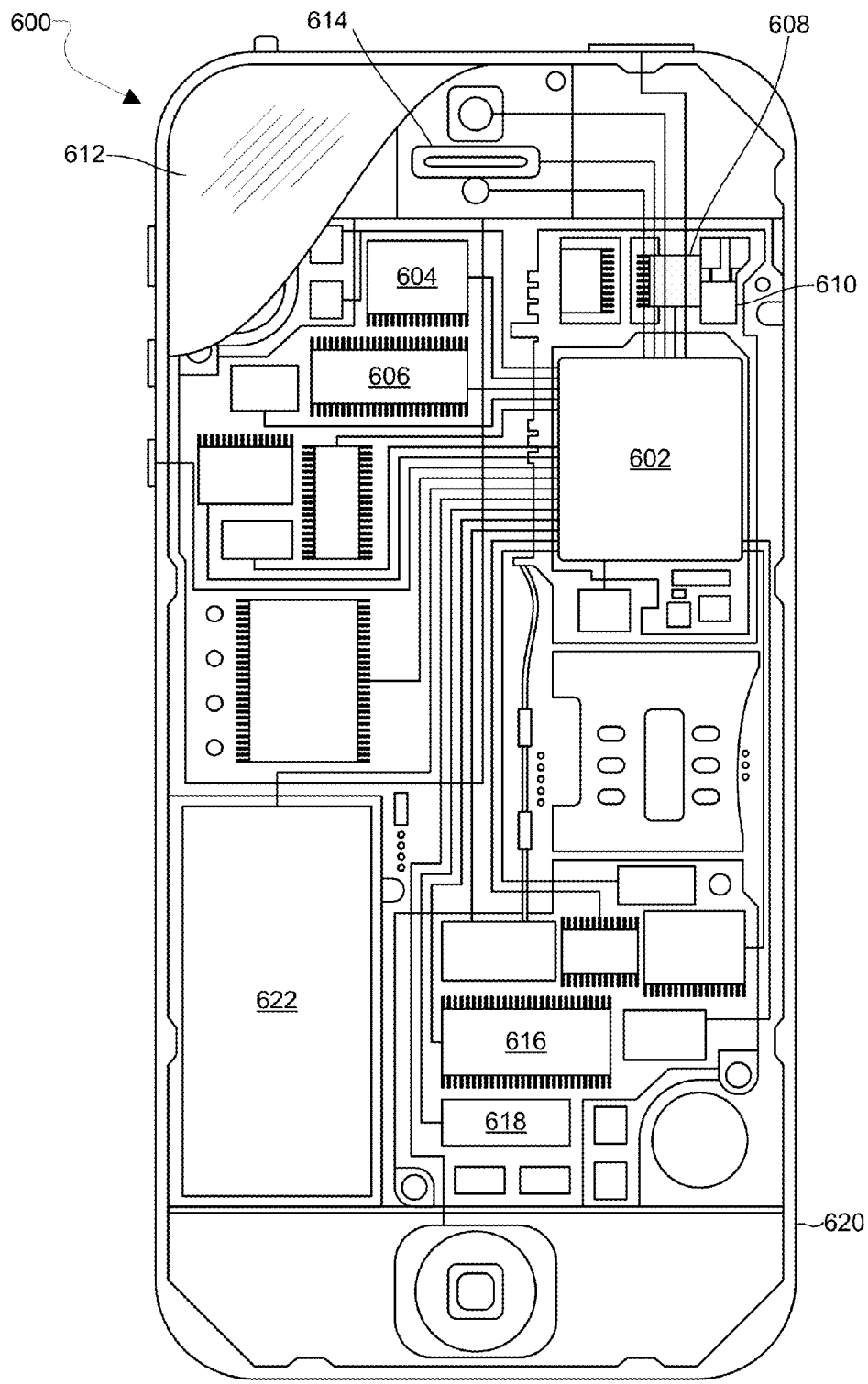
FIG. 6 is a component diagram of an example wireless device suitable for use with various embodiments.

The various embodiments (including, but not limited to, embodiments discussed above with reference to FIGS. 4 and 5) may be implemented in any of a variety of wireless devices, an example of which is illustrated in FIG. 6. For example, the wireless device 600 (which may correspond, for example, the wireless devices 102, 104, 200 in FIGS. 1-2) may include a processor 602 coupled to a touchscreen controller 604 and an internal memory 606. The processor 602 may be one or more multicore integrated circuits (ICs) designated for general or specific processing tasks. The internal memory 606 may be volatile or non-volatile memory, and may also be secure and/or encrypted memory, or unsecure and/or unencrypted memory, or any combination thereof.

The touchscreen controller 604 and the processor 602 may also be coupled to a touchscreen panel 612, such as a resistive-sensing touchscreen, capacitive-sensing touchscreen, infrared sensing touchscreen, etc. The wireless device 600 may have one or more radio signal transceivers 608 (e.g., Peanut®, Bluetooth®, Zigbee®, Wi-Fi, RF radio) and antennae 610, for sending and receiving, coupled to each other and/or to the processor 602. The transceivers 608 and antennae 610 may be used with the above-mentioned circuitry to implement the various wireless transmission protocol stacks and interfaces. The wireless device 600 may include a cellular network wireless modem chip 616 that enables communication via a cellular network and is coupled to the processor. The wireless device 600 may include a peripheral device connection interface 618 coupled to the processor 602. The peripheral device connection interface 618 may be singularly configured to accept one type of connection, or multiply configured to accept various types of physical and communication connections, common or proprietary, such as USB, FireWire, Thunderbolt, or PCIe. The peripheral device connection interface 618 may also be coupled to a similarly configured peripheral device connection port (not shown). The wireless device 600 may also include speakers 614 for providing audio outputs. The wireless device 600 may also include a housing 620, constructed of a plastic, metal, or a combination of materials, for containing all or some of the components discussed herein. The wireless device 600 may include a power source 622 coupled to the processor 602, such as a disposable or rechargeable battery. The rechargeable battery may also be coupled to the peripheral device connection port to receive a charging current from a source external to the wireless device 600.

Figure 7:
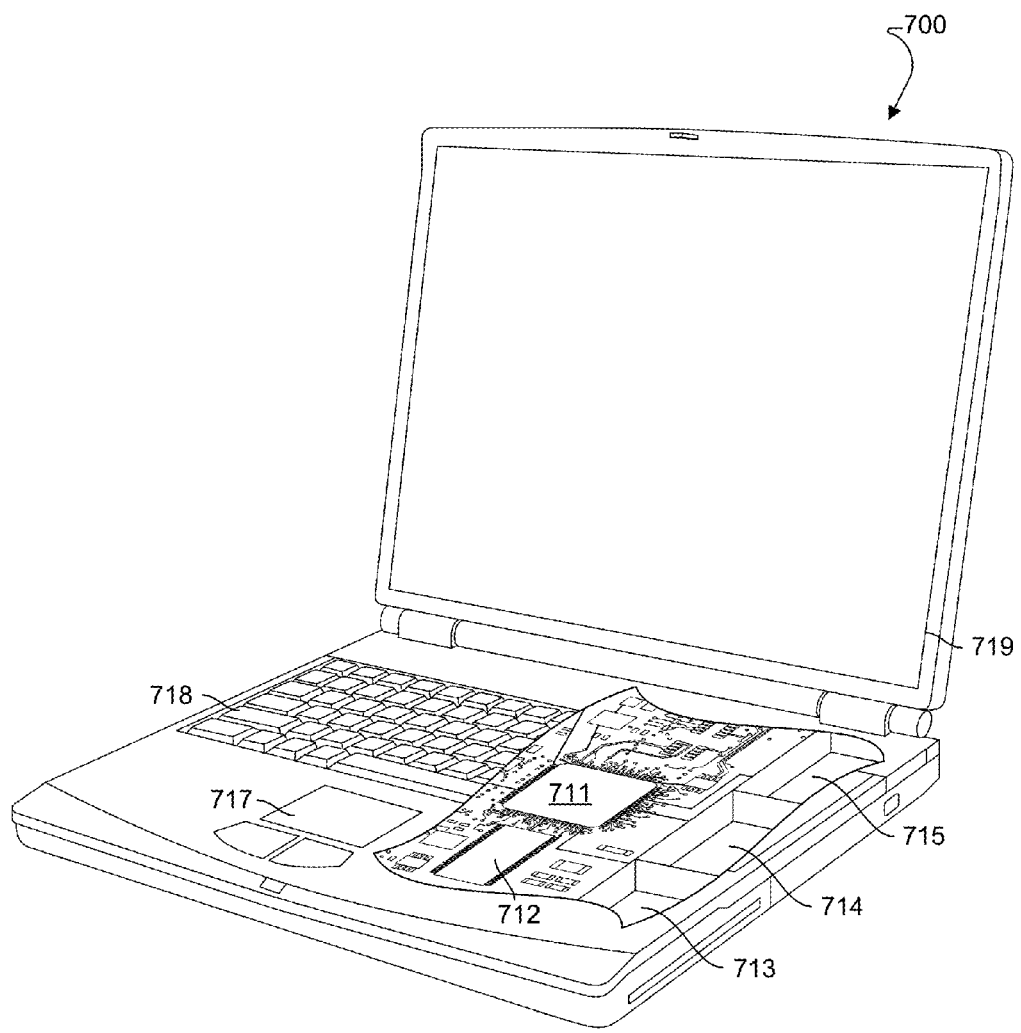
FIG. 7 is a component diagram of another example wireless device suitable for use with various embodiments.

The various embodiments described above (including, but not limited to, embodiments discussed above with reference to FIGS. 4 and 5) may also be implemented within a variety of personal computing devices, such as a laptop computer 700 as illustrated in FIG. 7. Many laptop computers include a touchpad touch surface 717 that serves as the computer's pointing device, and thus may receive drag, scroll, and flick gestures similar to those implemented on wireless computing devices equipped with a touch screen display and described above.

The laptop computer 700 will typically include a processor 711 coupled to volatile memory 712 and a large capacity nonvolatile memory, such as a disk drive 713 of Flash memory. The laptop computer 700 may also include a floppy disc drive 714 and a compact disc (CD) drive 715 coupled to the processor 711. The laptop computer 700 may also include a number of connector ports coupled to the processor 711 for establishing data connections or receiving external memory devices, such as a USB or FireWire® connector sockets, or other network connection circuits for coupling the processor 711 to a network. In a notebook configuration, the computer housing includes the touchpad touch surface 717, the keyboard 718, and the display 719 all coupled to the processor 711. Other configurations of the computing device may include a computer mouse or trackball coupled to the processor (e.g., via a USB input) as are well known, which may also be use in conjunction with various embodiments.

The processors 602 and 711 may be any programmable microprocessor, microcomputer or multiple processor chip or chips that can be configured by software instructions (applications) to perform a variety of functions, including the functions of various embodiments described above. In some devices, multiple processors may be provided, such as one processor dedicated to wireless communication functions and one processor dedicated to running other applications. Typically, software applications may be stored in the internal memory 606, 712 and 713 before they are accessed and loaded into the processors 602 and 711. The processors 602 and 711 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 602, 711, including internal memory or removable memory plugged into the device and memory within the processor 602 and 711, themselves.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an," or "the" is not to be construed as limiting the element to the singular.

While the terms "first" and "second" are used herein to describe data transmission associated with a SIM and data receiving associated with a different SIM, such identifiers are merely for convenience and are not meant to limit the various embodiments to a particular order, sequence, type of network or carrier.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or a non-transitory processor-readable storage medium. The steps of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of improving performance of a multi-subscriber identification module (SIM) wireless communication device having at least a first SIM associated with a first radio frequency (RF) resource and a second SIM associated with a second RF resource, the method comprising:

detecting a voice communication in a hold state on a modem stack associated with the first SIM and an active voice communication on a modem stack associated with the second SIM;

detecting a conflict between at least one silence descriptor (SID) frame scheduled for transmission by the modem stack associated with the first SIM and a transmit opportunity for the modem stack associated with the second SIM, wherein the at least one SID frame contains comfort noise parameters;

identifying a SID frame transmission rate for the modem stack associated with the first SIM; and applying a reduction scheme to SID frames scheduled to be transmitted by the modem stack associated with the first SIM, wherein the reduction scheme is based on the identified SID frame transmission rate.

2. The method of claim 1, wherein:

identifying the SID frame transmission rate comprises:
identifying a voice codec associated with transmit functions on the multi-SIM wireless communication device; and
identifying an interval at which SID_UPDATE frames are scheduled for transmission on the modem stack associated with the first SIM; and applying the reduction scheme comprises assigning priorities to the SID_UPDATE frames scheduled for transmission on the modem stack associated with the first SIM.

3. The method of claim 2, wherein assigning priorities to the SID_UPDATE frames scheduled for transmission on the modem stack associated with the first SIM comprises:

assigning a high priority to at least one out of every twenty SID_UPDATE frames that do not contain in-band signaling; and assigning a low priority to remaining SID_UPDATE frames that do not contain in-band signaling in response to identifying that the voice codec is an adaptive multi-rate codec.

4. The method of claim 3, wherein:

one out of every twenty SID_UPDATE frames not containing in-band signaling is assigned a high priority; and the remaining SID_UPDATE frames not containing in-band signaling are assigned a low priority.

5. The method of claim 2, wherein assigning priorities to the SID_UPDATE frames scheduled for transmission on the modem stack associated with the first SIM comprises:

assigning a high priority to at least one out of every ten SID_UPDATE frames; and assigning a low priority to remaining SID_UPDATE frames in response to identifying that the voice codec is one of a full rate codec, enhanced full rate codec, and a half rate codec.

6. The method of claim 5, wherein:

one out of every ten SID_UPDATE frames is assigned a high priority; and the remaining SID_UPDATE frames are assigned a low priority.

7. The method of claim 2, further comprising for each SID_UPDATE frame scheduled for transmission on the modem stack associated with the first SIM:

determining whether the SID_UPDATE frame is assigned a high priority or a low priority;

blanking the SID_UPDATE frame and allowing simultaneous transmit activity on the modem stack associated with the second SIM in response to determining that the SID_UPDATE frame is assigned a low priority; and transmitting the SID_UPDATE and blanking any simultaneous transmit activity on the modem stack associated with the second SIM in response to determining that the SID_UPDATE is assigned a high priority.

8. The method of claim 2, further comprising, for each SID_UPDATE frame scheduled for transmission on the modem stack associated with the first SIM:

determining whether any transmit or receive activity is required on the modem stack associated with the second SIM; and transmitting the SID_UPDATE regardless of its assigned priority in response to determining that no transmit or receive activity is required on the modem stack associated with the second SIM.

9. The method of claim 2, wherein assigning priorities to the SID_UPDATE frames scheduled for transmission on the modem stack associated with the first SIM comprises:

assigning a high priority to at least one out of a predetermined number of SID_UPDATE frames; and assigning a low priority to remaining SID_UPDATE frames.

10. The method of claim 1, wherein:

the first and second RF resources that are respectively associated with the first and second SIMs are each configured to perform both receive and transmit functions; and the detected conflict is based on coexistence interference between the transmit functions of the first and second RF resources.

11. The method of claim 1, wherein:

the first and second RF resources respectively associated with the first and second SIMs are configured to perform receive functions;

the first and second SIMs are configured to share a transmit resource; and the detected conflict is based on scheduling use of the shared transmit resource.

12. The method of claim 1, wherein the comfort noise parameters comprise information that enables a receiving device to synthesize noise that approximates background noise.

13. The method of claim 12, wherein the information that enables a receiving device to synthesize noise that approximates background noise includes line spectral frequency (LSF) and energy gain.

14. A multi-subscriber identification module (SIM) wireless communication device, comprising:

a first and second radio frequency (RF) resources respectively associated with a first and second SIMs; and a processor coupled to the first and second RF resources, wherein the processor is configured to:

detect a voice communication in a hold state on a modem stack associated with the first SIM and an active voice communication on a modem stack associated with the second SIM;

detect a conflict between at least one silence descriptor (SID) frame scheduled for transmission by the modem stack associated with the first SIM and a transmit opportunity for the modem stack associated with the second SIM, wherein the at least one SID frame contains comfort noise parameters;

identify a SID frame transmission rate for the modem stack associated with the first SIM; and apply a reduction scheme to SID frames scheduled to be transmitted by the modem stack associated with the first SIM, wherein the reduction scheme is based on the identified SID frame transmission rate.

15. The multi-SIM wireless communication device of claim 14, wherein the processor is further configured to:

identify the SID frame transmission rate by identifying a voice codec associated with transmit functions on the multi-SIM wireless communication device, and identifying an interval at which SID_UPDATE frames are scheduled for transmission on the modem stack associated with the first SIM; and apply the reduction scheme by assigning priorities to the SID_UPDATE frames scheduled for transmission on the modem stack associated with the first SIM.

16. The multi-SIM wireless communication device of claim 15, wherein the processor is further configured to assign priorities to the SID_UPDATE frames scheduled for transmission on the modem stack associated with the first SIM by:

assigning a high priority to at least one out of every twenty SID_UPDATE frames that do not contain in-band signaling; and assigning a low priority to remaining SID_UPDATE frames that do not contain in-band signaling in response to identifying that the voice codec is an adaptive multi-rate codec.

17. The multi-SIM wireless communication device of claim 16, wherein:

one out of every twenty SID_UPDATE frames not containing in-band signaling is assigned a high priority; and the remaining SID_UPDATE frames not containing in-band signaling are assigned a low priority.

18. The multi-SIM wireless communication device of claim 15, wherein the processor is further configured to assign priorities to the SID_UPDATE frames scheduled for transmission on the modem stack associated with the first SIM by:

assigning a high priority to at least one out of every ten SID_UPDATE frames; and assigning a low priority to remaining SID_UPDATE frames in response to identifying that the voice codec is one of a full rate codec, enhanced full rate codec, and a half rate codec.

19. The multi-SIM wireless communication device of claim 18, wherein:

one out of every ten SID_UPDATE frames is assigned a high priority; and wherein the remaining SID_UPDATE frames are assigned a low priority.

20. The multi-SIM wireless communication device of claim 15, wherein the processor is further configured to, for each SID_UPDATE frame scheduled for transmission on the modem stack associated with the first SIM:

determine whether the SID_UPDATE frame is assigned a high priority or a low priority;

blank the SID_UPDATE frame and allow simultaneous transmit activity on the modem stack associated with the second SIM in response to determining that the SID_UPDATE frame is assigned a low priority; and transmit the SID_UPDATE and blank any simultaneous transmit activity on the modem stack associated with the second SIM in response to determining that the SID_UPDATE is assigned a high priority.

21. The multi-SIM wireless communication device of claim 15, wherein the processor is further configured to, for each SID_UPDATE frame scheduled for transmission on the modem stack associated with the first SIM:

determine whether any transmit or receive activity is required on the modem stack associated with the second SIM; and transmit the SID_UPDATE regardless of its assigned priority in response to determining that no transmit or receive activity is required on the modem stack associated with the second SIM.

22. The multi-SIM wireless communication device of claim 15, wherein:

the processor is further configured to assign priorities to the SID_UPDATE frames scheduled for transmission on the modem stack associated with the first SIM by:

assigning a high priority to at least one out of a predetermined number of SID_UPDATE frames; and assigning a low priority to remaining SID_UPDATE frames.

23. The multi-SIM wireless communication device of claim 14, wherein:

the first and second RF resources that are respectively associated with the first and second SIMs are each configured to perform both receive and transmit functions; and the detected conflict is based on coexistence interference between the transmit functions of the first and second RF resources.

24. The multi-SIM wireless communication device of claim 14, wherein:

the first and second RF resources respectively associated with the first and second SIMs are configured to perform receive functions;

the first and second SIMs are configured to share a transmit resource; and the detected conflict is based on scheduling use of the shared transmit resource.

25. The multi-SIM wireless communication device of claim 14, wherein the comfort noise parameters comprise information that enables a receiving device to synthesize noise that approximates background noise.

26. The multi-SIM wireless communication device of claim 25, wherein the information that enables a receiving device to synthesize noise that approximates background noise includes line spectral frequency (LSF) and energy gain.

27. A multi-subscriber identification module (SIM) wireless communication device, comprising:

at least one radio frequency (RF) resource;

means for detecting a voice communication in a hold state on a modem stack associated with a first SIM and an active voice communication on a modem stack associated with a second SIM;

means for detecting a conflict between a silence descriptor (SID) frame scheduled for transmission by the modem stack associated with the first SIM and a transmit opportunity for the modem stack associated with the second SIM, wherein the at least one SID frame contains comfort noise parameters;

means for identifying a SID frame transmission rate for the modem stack associated with the first SIM; and means for applying a reduction scheme to SID frames scheduled to be transmitted by the modem stack associated with the first SIM, wherein the reduction scheme is based on the identified SID frame transmission rate.

28. A non-transitory processor-readable storage medium having stored thereon processor-executable instructions configured to cause a processor of a multi-subscriber identification module (SIM) wireless communication device having at least a first SIM associated with a first radio frequency (RF) resource, and a second SIM associated with a second RF resource, to perform operations comprising:

detecting a voice communication in a hold state on a modem stack associated with the first SIM and an active voice communication on a modem stack associated with the second SIM;

detecting a conflict between at least one silence descriptor (SID) frame scheduled for transmission by the modem stack associated with the first SIM and a transmit opportunity for the modem stack associated with the second SIM, wherein the at least one SID frame contains comfort noise parameters;

identifying a SID frame transmission rate for the modem stack associated with the first SIM; and applying a reduction scheme to SID frames scheduled to be transmitted by the modem stack associated with the first SIM, wherein the reduction scheme is based on the identified SID frame transmission rate.

* * * * *